US008870381B2

(12) United States Patent
Freeman et al.

(10) Patent No.: US 8,870,381 B2
(45) Date of Patent: Oct. 28, 2014

(54) MIXED POLARIZATION IMAGING SYSTEM FOR THREE-DIMENSIONAL PROJECTION AND CORRESPONDING METHODS

(75) Inventors: Mark O. Freeman, Snohomish, WA (US); P. Selvan Viswanathan, Redmond, WA (US); David Lashmet, Bainbridge Island, WA (US)

(73) Assignee: Microvision, Inc., Redmond, WA (US)

( * ) Notice: Subject to any disclaimer, the term of this patent is extended or adjusted under 35 U.S.C. 154(b) by 230 days.

(21) Appl. No.: 13/206,936

(22) Filed: Aug. 10, 2011

(65) Prior Publication Data

US 2013/0038837 A1 Feb. 14, 2013

(51) Int. Cl.
*G03B 21/00* (2006.01)
*G03B 21/14* (2006.01)
*G02B 27/26* (2006.01)
*G03B 21/26* (2006.01)

(52) U.S. Cl.
USPC .............. 353/8; 353/20; 353/94; 359/465

(58) Field of Classification Search
USPC .......... 353/7, 8, 20, 31, 30, 94; 359/465, 462; 349/5, 7, 8, 9; 348/42, 51
See application file for complete search history.

(56) References Cited

U.S. PATENT DOCUMENTS

| | | | |
|---|---|---|---|
| 6,433,907 B1 | 8/2002 | Lippert | |
| 2003/0214633 A1* | 11/2003 | Roddy et al. | 353/31 |
| 2006/0268404 A1* | 11/2006 | Hyobu | 359/456 |
| 2007/0132953 A1 | 6/2007 | Silverstein | |
| 2007/0153235 A1* | 7/2007 | Morikawa et al. | 353/20 |
| 2009/0059173 A1* | 3/2009 | Azor et al. | 353/20 |
| 2009/0213330 A1 | 8/2009 | Silverstein et al. | |
| 2010/0315595 A1* | 12/2010 | Marcus et al. | 353/8 |
| 2011/0063574 A1 | 3/2011 | Freeman | |
| 2011/0242490 A1* | 10/2011 | Itoh | 353/8 |

OTHER PUBLICATIONS

Jachimowicz, et al., "Stereoscopic 3D Projection Display Using Polarized Color Multiplexing", *Optical Engineering* vol. 29 No. 8 Aug. 1990, 838-842.
Microvision, Inc. "International Search Report and Written Opinion", ISR and Written Opinion PCT/US2012/049341 Feb. 26, 2013.

* cited by examiner

*Primary Examiner* — William C Dowling
*Assistant Examiner* — Ryan Howard
(74) *Attorney, Agent, or Firm* — Kevin D. Wills

(57) ABSTRACT

An imaging system (300) configured to reduce perceived flicker in three-dimensional images is provided. The imaging system (300) can include a plurality of light sources (305,306, 307), a light combiner (302), a light modulator (303) and a polarization rotator (301). The light combiner (302) combines light received from each of the light sources into a combined beam (304). A first light portion (313) in the combined beam has a first light portion polarization state that is different from a second light portion polarization state of a second light portion (314). The light modulator (303) produces images by modulating the combined beam (304) along a projection surface (316). The polarization rotator (301) selectively rotates a polarization state of the combined beam (304) in synchrony with an image refresh cycle of the imaging system. A circular polarizer (1004) can be used to transform linear polarization states to circular polarization states.

20 Claims, 11 Drawing Sheets

US 8,870,381 B2

MIXED POLARIZATION IMAGING SYSTEM FOR THREE-DIMENSIONAL PROJECTION AND CORRESPONDING METHODS

BACKGROUND

1. Technical Field

This invention relates generally to imaging systems, and more particularly to a single projector imaging system configured to produce three-dimensional images.

2. Background Art

A common approach to producing three-dimensional images in a projection system is to employ "stereo vision." In a stereo three-dimensional projection system, two different images are projected on a projection surface. Each image has data captured from a slightly different perspective. A first projector presents a first image, while a second projector presents a second, slightly different image that is overlayed on the first image. Special glasses then direct the images only to a single eye. For example, the first image may be directed into the right eye, and the second image may be directed into the left eye. The viewer's brain then resolves these images to deliver a depth perspective and make the images appear to "pop out" of the screen.

While the two-projector system works well in practice, it would be advantageous to have a single projector system capable of delivering three-dimensional images to a viewer. One problem with prior art single projector systems has been the introduction of visible artifacts, such as flicker. There is thus a need for an improved single-projector three-dimensional projection system that reduces or eliminates the visible artifacts associated with prior art designs.

Figure 1:
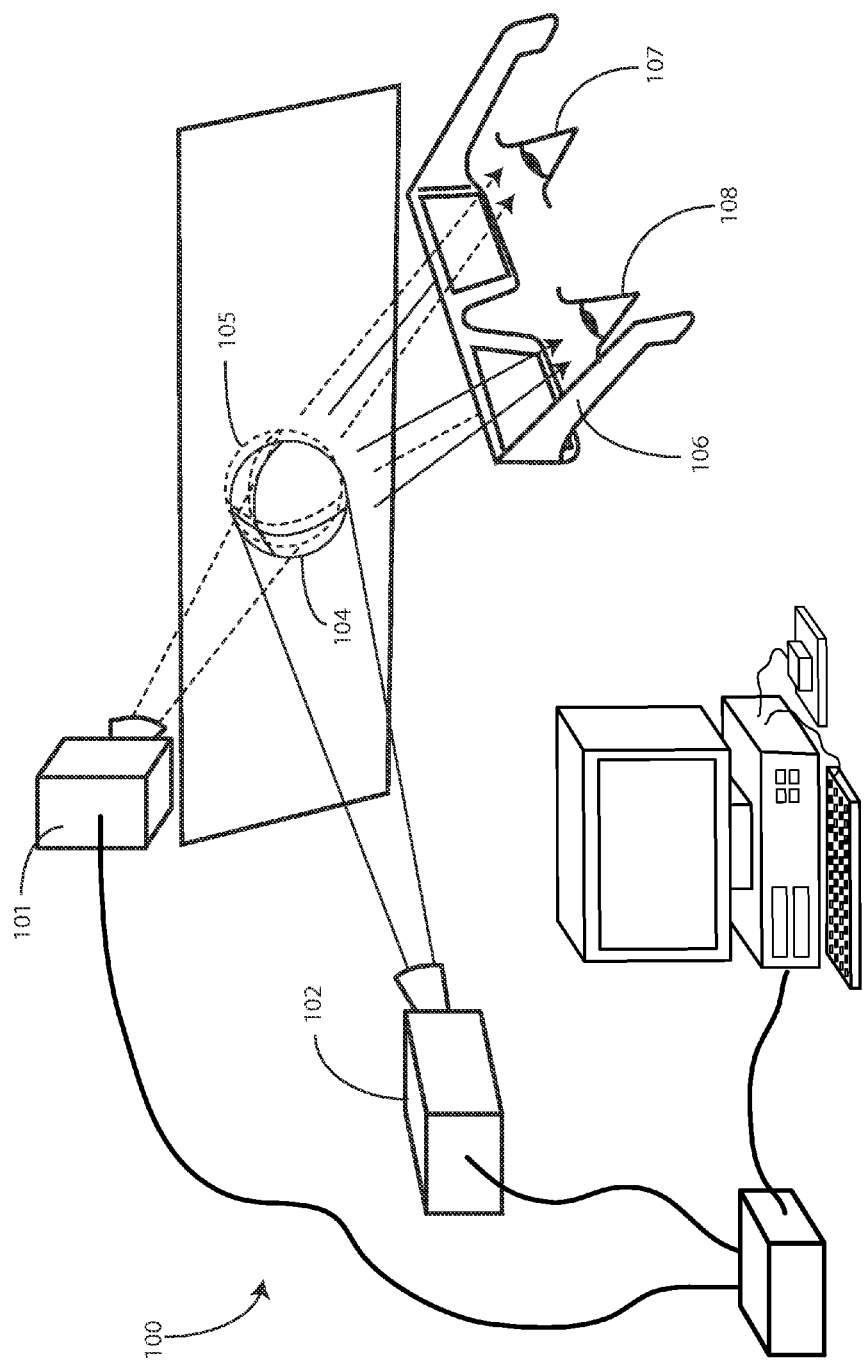
FIG. 1 illustrates a prior art three-dimensional projection system employing two projectors.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to an imaging system configured to present three-dimensional images with a single projector, yet with reduced or eliminated flicker artifacts. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of producing three-dimensional images as described herein. The non-processor circuits may include, but are not limited to, microprocessors, scanning mirrors, image modulation devices, memory devices, clock circuits, power circuits, and so forth. As such, these functions may be interpreted as steps of a method to perform three-dimensional imaging. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a single projector three-dimensional imaging system that delivers dual-frame, three-dimensional imagery from a single-frame bandwidth input. Moreover, embodiments describe herein produce the three-dimensional images with reduced flicker artifacts. This is achieved, in one embodiment, by configuring some light sources disposed within the imaging system to have a different polarity from other light sources within the imaging system. Light from each of the sources is then combined to form a combined beam that has some components that are polarized in a first orientation, while other components are polarized in a different orientation. This results in light from a single projector delivering information from two perspectives to both the right eye and left eye simultaneously during every frame. Said differently, where three-dimensional video input includes, for example, right eye information and left eye information, light containing information from both perspectives is incident onto both the viewer's right eye and left eye simultaneously during every frame, all while using a single projector.

For example, some components of the combined beam can have polarization states that are oriented substantially orthogonally relative to the polarization states other components of the combined beam. The components of the combined beam are then used to create three-dimensional images, with components having a first polarization orientation initially creating left eye images, and components having a second polarization orientation initially creating right eye images. Glasses with polarization filtering lenses, with the filters of each lens oriented substantially orthogonally from the other, then direct the proper image to the proper eye.

A polarization rotator is then used to selectively alter the polarization orientation of each component of the combined beam between consecutive frames. For example, in one embodiment, the polarization orientation can be rotated by about ninety degrees between successive image refresh sweeps to cause the polarization orientations of the components of the combined beam to transition from a first orientation to a second orientation. Thus, the portions of the combined beam that had the first polarization orientation now have the second polarization orientation, and vice versa. Accordingly, the portions of the combined beam are now directed into a different eye than had occurred in the previous frame. Odd image refresh sweeps can occur with the polarization rotator in a first polarization orientation, and even refresh sweeps can occur with the polarization rotator in the second polarization orientation. Each of the components in the combined beam will be rotated between consecutive frames, in one embodiment, about ninety degrees from sweep to sweep, thereby delivering information to a different eye with each successive frame. This selective rotation of polarization allows a single projector to produce high quality three-dimensional images at a standard frequency, such as 60 Hz, with little or no flicker. Other sub-120 Hz refresh frequencies can also be used, including 75 Hz, 80 Hz, or 90 Hz.

In one embodiment, the polarization rotator is a twisted nematic liquid crystal device. In another embodiment, the polarization rotator is a ferroelectric liquid crystal device. Other devices configured to selectively alter the polarization orientation between an incident beam between refresh sweeps can also be used. The polarization rotator is configured to deliver, as an output, a first polarization orientation during a first image refresh sweep, and another polarization orientation during a sequentially subsequent image refresh sweep.

Illustrating by example, the composite beam may be formed by a light combiner that receives light from a plurality of light sources. In one embodiment, the plurality of light sources comprises a red light source, a green light source, and a blue light source. The green light may be p-polarized relative to the light combiner, while the red and blue light may be s-polarized relative to the light combiner. When the green, red, and blue light are combined, the green light has a polarization orientation that is orthogonal with the polarization orientation of the red and blue light. The polarization rotator causes the polarization of the composite beam to rotate between each successive frame, thereby causing any "vertically" polarized components in one frame to become "horizontally" polarized components in the next frame. (The terms vertical and horizontal are used only to illustrate conceptually the operation of the polarization rotator, as there is no requirement that any component be specifically vertically or horizontally polarized.) The continued delivery of mixed, changing polarization light to each eye—such that each eye continually receives information with polarization components that change from frame to frame—reduces perceived flicker in the resulting three-dimensional images.

Turning now to FIG. 1, illustrated therein is a prior art three-dimensional projection system 100 employing two projectors 101,102. Stereoscopic image data is delivered from a source 103 to each projector 101,102. The stereoscopic image data includes right images and left images, each having a different characteristic and each having been captured from a slightly different perspective. In this illustration, the left image 104 is a magenta image and the right image 105 is a cyan image. A user then wears special glasses 106. The special glasses 106 include a lens that is a cyan filter and a lens that is a magenta filter. The special glasses 106 cause only the image from the first projector 101 to enter the right eye 107. Similarly, the special glasses 106 cause the image from the second projector 102 to enter the left eye 108. The wearer's brain then resolves the two images 104,105 as a three-dimensional object.

While the system 100 of FIG. 1 works well in practice, it suffers from drawbacks. First, it requires two projectors 101, 102. Second, the projectors 101,102 need to be fixedly arranged, as movement of either projector 101,102 could compromise the image quality perceived by the viewer. For these reasons, there have been attempts to create a single-projector three-dimensional projection system. One prior art system 200 is shown in FIG. 2.

Figure 2:
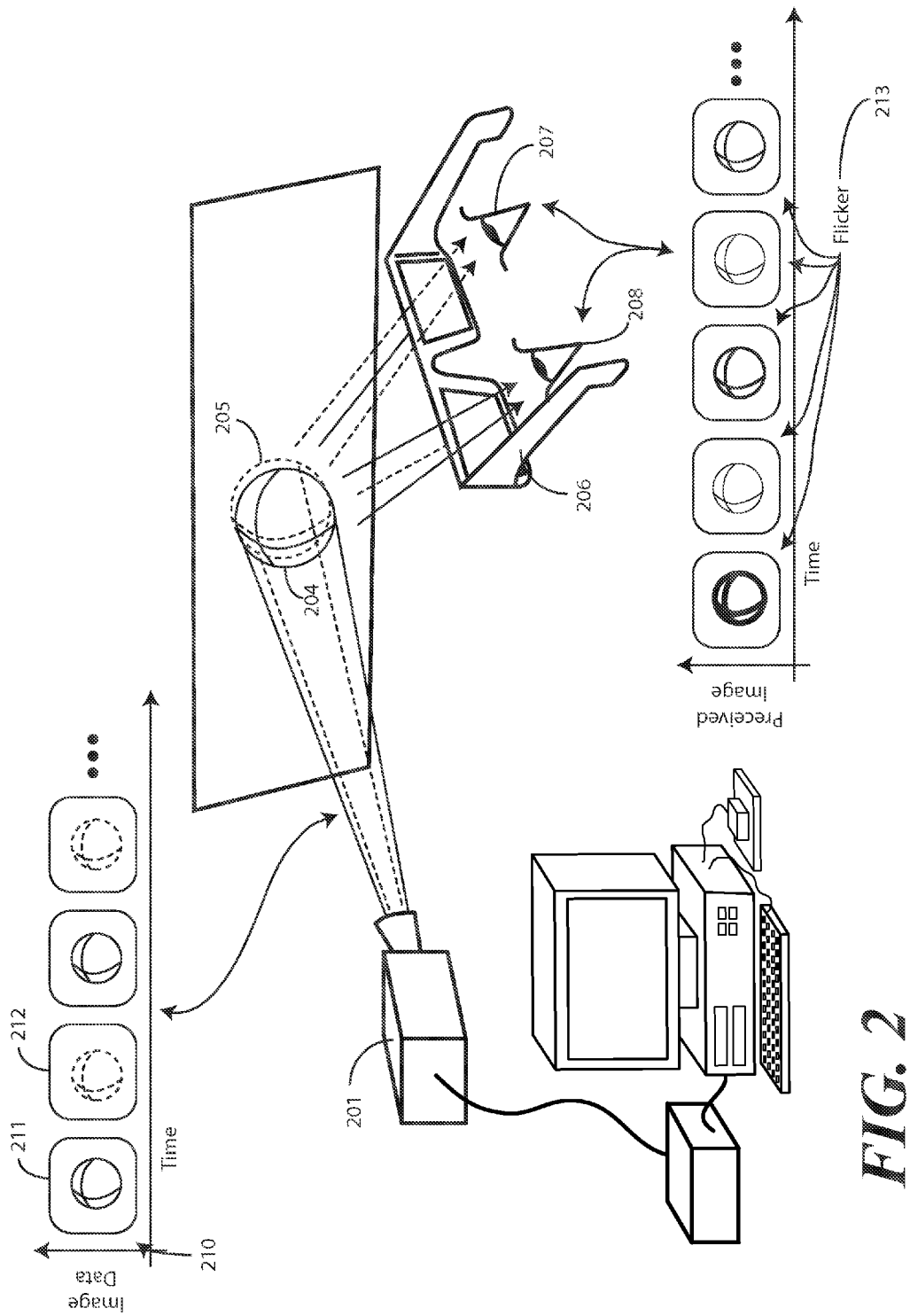
FIG. 2 illustrates a prior art single-projector three-dimensional projection system that exhibits the visible artifact of flicker.

As shown in FIG. 2, a single projector 201 produces two images 204,205 by alternating between frames of content 210. Said differently, rather than overlaying images as the two projectors (101,102) did in FIG. 1, the single projector 201 of FIG. 2 presents the images sequentially, such that a first frame 211 is a cyan or "left eye" image, a second frame 212 is a magenta or "right eye" image, and so forth. As with the system (100) of FIG. 1, special glasses 206 cause the cyan image frames to be delivered to the left eye 208 and magenta image frames to be delivered to the right eye 207.

The problem with this approach is that it requires the projection frequency of the single projector 201 to be double that of the projectors (101,102) of FIG. 1. While the projectors (101,102) of FIG. 1 may present the images at a standard frequency of 60 Hz, the single projector 201 of FIG. 2 must operate at a frequency of 120 Hz or more to avoid a perceived artifact known as flicker 213. Flicker 213 is a changing intensity of light that is perceived by the human visual cortex between image refresh cycles. Its perception particularly notorious in single-projector three-dimensional image projection systems because only every other image is delivered to a particular eye. Thus, when projecting at 60 Hz, only 30 frames per second reach, for example, the right eye 207. This results in a perceived fading of the image between refresh cycles at the visual cortex, which manifests itself in the mind as perceived flicker 213. The light intensity of content can exacerbate perceived flicker 213 when it changes quickly.

Figure 3:
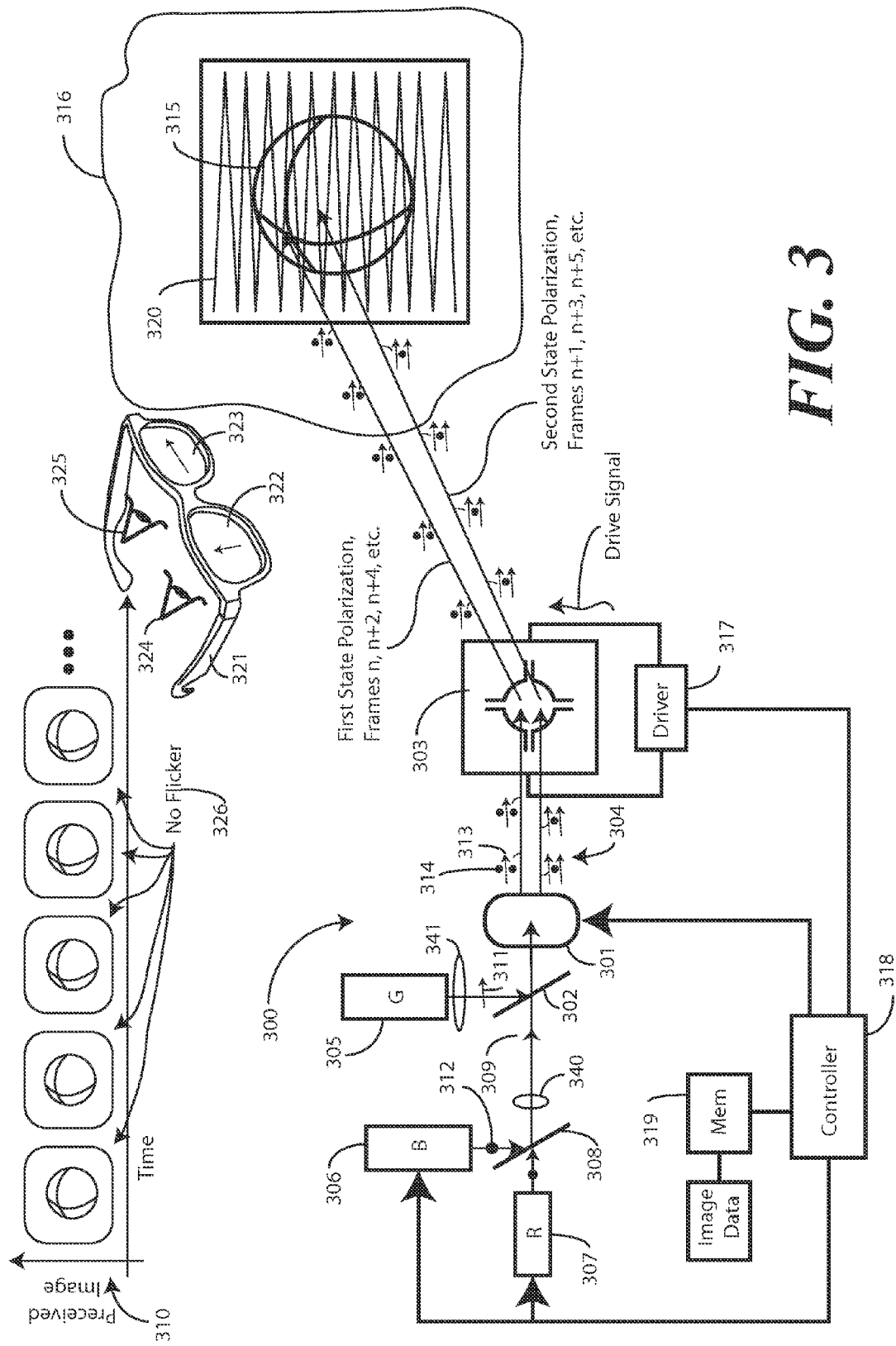
FIG. 3 illustrates one imaging system configured in accordance with one or more embodiments of the invention.

Turning now to FIG. 3, illustrated therein is a single-projector imaging system 300 that is configured to present images with little or no flicker while still maintaining suitable color quality. The imaging system 300 of FIG. 3 accomplishes this by employing a combined beam 304 having diverse polarization oriented portions and a polarization rotator 301. In the illustrative embodiment of FIG. 3, the polarization rotator 301 is disposed along an optical path of the imaging system 300 between a light combiner 302 and a light modulator 303. The polarization rotator 301 is configured to selectively rotate a polarization state of a combined beam 304 in synchrony with an image refresh cycle of the imaging system 300. This selective rotation of the polarization state allows a single video stream 310 to carry both left eye and right eye information in each frame. Left eye information is configured with a first polarization orientation in a first frame, and right eye information is configured with a second polarization orientation in a first frame. In one embodiment, the first polarization orientation and second polarization orientation are substantially orthogonal. The imaging system 300 thus delivers dual frame information with a single frame input or resolution. In a next frame, when the polarization rotator 301 causes the polarization orientation of the combined beam 304 to rotate, the left eye information is configured with the second polarization orientation and the right eye information is configured with the first polarization orientation. The imaging system 300 thus fully captures stereo information through polarization diversity in the combined without increasing the bandwidth of the video input. As the components delivering information to each eye change from frame to frame, flicker is reduced and without degrading the color quality. In short, the imaging system 300 delivers a high-quality, flicker reduced, three-dimensional image with good color quality, all from a single projector.

As shown in FIG. 3, a plurality of light sources includes a green light source 305, a blue light source 306, and a red light source 307. While the plurality of light sources can be various types of light sources, in this illustrative embodiment they are laser light sources. Accordingly, the green light source 305 comprises a green laser light source. Similarly, the blue light source 306 comprises a blue laser light source and the red light source 307 comprises a red laser light source. The red laser light source, green laser light source, and blue light source are indicated in FIG. 3 with the "R," "G," and "B." Where lasers are used as the light sources, the lasers can be any of a variety of types of lasers, including semiconductor lasers such as edge-emitting lasers or vertical cavity surface emitting lasers. Such semiconductor lasers are well known in the art and are commonly available from a variety of manufacturers.

One or more light combiners 302,308 are configured to combine light received from the various light sources, 305, 306,307. In one embodiment, dichroic mirrors are used as the light combiners 302,308. Dichroic mirrors are partially reflective mirrors that include dichroic filter coatings that selectively pass light in a narrow wavelength bandwidth while reflecting others. Note that the location, as well as the number, of the light combiners 302,308 can vary based upon application.

In the illustrative embodiment of FIG. 3, the light sources 305,306,307 are disposed with a particular orientation. Other orientations can be used without departing from the spirit and scope of the invention, and some of these other orientations are described below. In this illustrative embodiment the red light source 307 and blue light source 306 are oriented so as to deliver light beams to light combiner 308. The resultant beam 309, which comprises blue and red light components, passes through an optional lens 340 to another light combiner 302. The green light source 305 is oriented to deliver a light beam through an optional lens 341 to light combiner 302 as well. The output of light combiner 302 is a combined beam 304 comprising red, green, and blue light components.

In the illustrative embodiment of FIG. 3, the red light and blue light is polarized differently from the green light. In FIG. 3, with reference to the surface of light combiner 302, the green light is p-polarized, as indicated by arrow 311. The red light and blue light are s-polarized with reference to light combiner 302, as indicated by circle 312. This polarization orientation configuration was selected because the coatings of light combiner 302 can be manufactured less expensively when the green light is p-polarized relative to the surface of light combiner 302. However, it will be clear to those of ordinary skill in the art having the benefit of this disclosure that embodiments of the invention are not so limited. For example, in another embodiment, the green light is s-polarized with reference to light combiner 302, while the red and blue light are p-polarized with reference to light combiner 302.

Since the red and blue light are polarized differently from the green light, once light combiner 302 combines the received beams, the combined beam 304 will include a first light portion 313 having a first light portion polarization state and a second light portion 314 having a second light portion polarization state. In this illustrative embodiment, the first light portion polarization state and the second light portion polarization state are substantially orthogonal. The combined beam 304 is then delivered to a light modulator 303. In this illustrative embodiment, the light modulator 303 is configured to produce images 315 by scanning the combined beam 304 along a projection surface 316.

In one embodiment, the light modulator 303 can be a MEMS scanning mirror, such as those manufactured by Microvision, Inc. Examples of MEMS scanning mirrors, such as those suitable for use with embodiments of the present invention, are set forth in commonly assigned U.S. patent application Ser. No. 11/786,423, filed Apr. 10, 2007, entitled, "Integrated Photonics Module and Devices Using Integrated Photonics Module," which is incorporated herein by reference, and in U.S. Published patent application Ser. No. 10/984,327, filed Nov. 9, 2004, entitled "MEMS Device Having Simplified Drive," which is incorporated herein by reference. A MEMS light modulator is well suited to embodiments of the invention due to its compact construction, cost effectiveness, and reliability. While a MEMS device will be used herein for discussion purposes, it will be clear to those of ordinary skill in the art having the benefit of the disclosure that other modulator platforms may be used as well such as DLP or DMD modulators. Furthermore, with an appropriate polarization filter that creates mixed polarization states and a polarization rotator placed after the light modulator, the same method of creating mixed polarization, flicker reduced three-dimensional images can be applied with liquid crystal image modulators.

The light modulator 303 is responsive to a driver 317 and a control circuit 318. The control circuit 318 can comprise one or more processors that execute instructions stored in a corresponding memory 319. The control circuit 318 and driver 317, in one embodiment are configured to deliver a drive signal to the light modulator 303 based upon the video stream 310, which may be stored in the memory 319. The driver 317 can cause the light modulator 303 then to sweep the combined beam 304 to form the image 315. In one embodiment, the light modulator 303 is configured to form the image 315 by moving in a raster pattern. Each raster scan of the raster pattern can comprise a frame of three-dimensional content. Each raster scan can refresh a three-dimensional image by redrawing it. The refresh rate is 60 Hz in one embodiment. In other embodiments, other sub-120 Hz frequencies can be used, including 75 Hz, 80 Hz, or 90 Hz.

Figure 4:
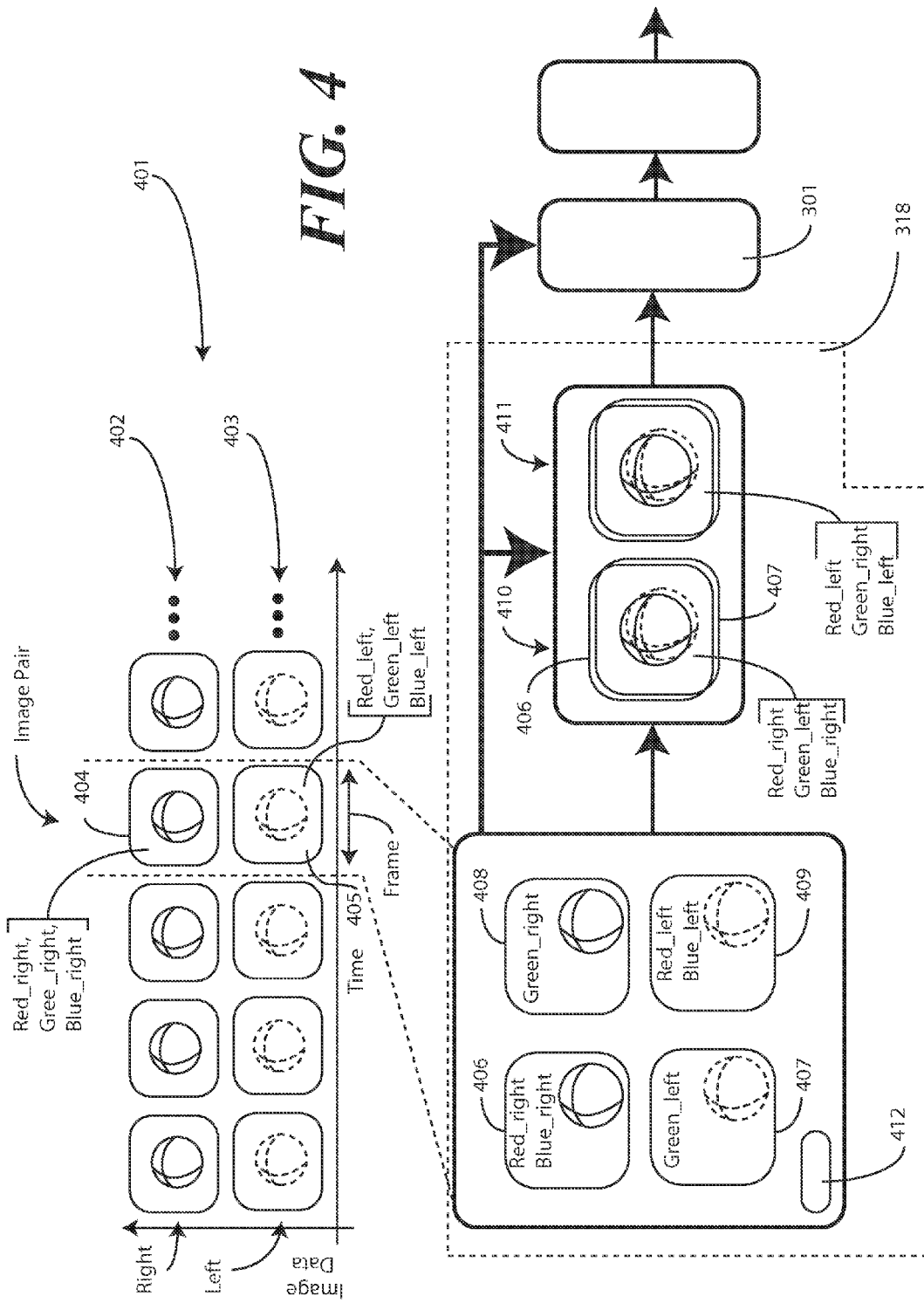
FIG. 4 illustrates a processing system and method, suitable for a control circuit in an imaging system, which is configured in accordance with one or more embodiments of the invention.

Turning briefly to FIG. 4, illustrated therein is one method of processing three-dimensional video input that can be used by the control circuit 318 of FIG. 3. In three-dimensional image projection systems, the video input 401 is stereoscopic content, which means that pairs of images are provided for each frame. Said differently, a full RGB right image captured by a "right side" camera, e.g., image 404, and a full RGB left image captured by a "left side" camera, e.g., image 405, are delivered in pairs for each frame of content. The illustrative video input 401 of FIG. 4 is thus shown as including a series of right eye images 402 and a series of left eye images 403. Each image pair forms a frame of three-dimensional video content.

In accordance with one or more embodiments, the control circuit 318 splits the images forming each frame into color panes. The specific color information is indicated in FIG. 4. Image 404, which is a right eye image, includes red, green and blue information. Similarly, image 405, which is a left eye image, includes its own red, green, and blue information. Image 404 is broken into a first color pane 406 and a second color pane 408. The first color pane 406 includes red and blue information from image 404. The second color pane 408 includes green information from image 404. Similarly, image 405, which is a left eye image, is broken into a first color pane 407 and a second color pane 409. The first color pane 407 includes green information from image 405, while the second color pane 409 includes red information and blue information from image 405.

Color pane 406 and color pane 407 are combined into frame 410, which includes red and blue information from image 404, and green information from image 405. Color pane 408 and color pane 409 are combined into frame 411, with red and blue information from image 405 and green information from image 404. For each sequential frame of the mixed polarization system, the polarization states of the green information and the red/blue information are changed. For example, if green light from image 405 and red/blue light from image 404 are polarized with a first orientation, while red/blue light from image 405 and green light from image 404 are polarized with a second orientation, with that polarization changing on a frame by frame basis, flicker is reduced. Where other color combinations are used, as discussed in FIGS. 7 and 8 below, the color panes will be different than in this example.

Note that in the illustrative embodiment of FIG. 4, a single input frame having image 404 and 405 results in two output frames 410,411. While this is one embodiment, others can be used in accordance with embodiments of the invention as well. Where, for example, the video input 401 is 30 Hz video input, the process shown in FIG. 4 works to deliver a projected output at 60 Hz, which is suitable in some applications. However, in other applications two output frames 410,411 may not be needed. For instance, if the video input 401 is 60 Hz video input, a particular application may prefer output frames on a one-to-one correspondence with input frames. Where this is the case, the embodiment of FIG. 4 can still be used. However, rather than creating output images with both frame 410 and frame 411, one of these frames can be discarded or not used. Alternatively, a control circuit may only create one output frame, e.g., either frame 410 or frame 411, rather than creating both. Where only one output frame is used, the composition of the output frame can vary across time as well. Red light and blue light from a right eye image may be used for even output frames, while red light and blue light from a left eye image may be used for odd output frames, and so forth.

As an example, discarding a red-blue right/green left information from one frame when the video input 401 is 60 Hz for the stereo pairs of information, and then dropping the red-blue left/green right information from the next frame maintains the correct alternation of colors to eyes, thus maintaining the color balance. At the same time, it does not require the output to be at double the frame rate of the video input 401. This approach results in an output video stream that carries three-dimensional information without expanding the frame rate. Said differently, it carries three-dimensional information with the video stream bandwidth of a standard, two-dimensional video stream.

Of course, combinations of these approaches may be used as well. Where the video input 401 is 48 Hz, eighty percent of the output frames may be pairs generated from a single input frame, while twenty percent of the output frames may be a single output frame after a complementary output frame is discarded.

In some embodiments, pairs of frames can be dropped. For example, rather than dropping either frame 410 or frame 411, the pair can be dropped. Output images are then formed by every other pair of frames that is generated by the system. Thus, for a 60 Hz input, sixty output frames would be used, with those sixty output frames being created from either even or odd input frames.

When dropping or not using frames, it can be important to preserve color balance across successive images. For example, dropping every other output frame can result in a perceived double color shift, which can be undesirable to the viewer. In many embodiments, when one frame of an output pair is dropped, the next output frame to be displayed will be the opposite color schema from the previously displayed frame. One method that accomplishes this is dropping output frames in pairs. Alternatively, one could drop a single frame and recompose the subsequent output frame with opposite color information. Another method would be to preclude content from one set of original stereo pairs from being combined with content from a previous or subsequent stereo pair to create output frames. In the 48 Hz example above, color balance can be preserved when the twelve "extra" frames must maintain the red-blue right/green left, red-blue left/green right pairings of the surrounding frames. For example, four incoming frames can be converted into six output frames, where each successive frame rigorously alternates between red-blue right/green left, red-blue left/green right information. This would prevent perceived color shifts.

Color panes 407,408 can then be used to drive some light sources in an image processing system, while color panes 406,409 will be used to drive other light sources. The color panes 406,407,408,409 are "stitched" together in this manner to deliver stereo information in a singular frame.

Illustrating by example with reference to FIG. 3, color panes (407,408) can be used to drive the green light source 305, while color panes (406,409) can be used to drive the blue light source 306 and red light source 307. Accordingly, in the combined beam, the first light portion 313 of the combined beam 304 will create images from color panes (407,408), while the second light portion (314) will create images from the second color panes (406,409).

The control circuit 318 combines the color panes (406,407, 408,409) to form single frame sequences that include both left eye content and right eye content. In this fashion image data from the series of right eye images 402 is stitched together with image data from the series of left eye images 403 to form a series of frames that carries both left and right information in each frame. The series of frames thus fully capture the stereo information from the video input 401 without increasing the bandwidth of the video beyond the capabilities of a single projector.

In conjunction with the modulation of the light sources 305,306,307, the driver 317 is operative to pivot the light modulator 303 about a first axis and second axis by delivering a control signal to the light modulator 303. This pivoting action causes the scanned light to move horizontally and vertically to form a three-dimensional image 315. As noted above, the pivoting can occur in accordance with a raster pattern 320. The raster pattern 320 can be refreshed at an image refresh cycle. A common refresh cycle suitable for use with embodiments of the present invention is 60 Hz. When using a 60 Hz refresh cycle, for example, the image will be redrawn sixty times per second. It should be understood that embodiments of the present invention offer advantages over prior art inventions in that sub-120 Hz frequencies can be used while ensuring that little or no flicker occurs in imaging. Other sub-120 Hz frequencies include 75 Hz, 80 Hz, and 90 Hz.

In one or more embodiments, the polarization rotator 301 is a device that is configured to, either electrically, mechanically, or by combinations thereof, alter a polarization orientation of portions 313,314 of the combined beam 304 in synchrony with the image refresh cycle, e.g., between image refresh sweeps. Said differently, between each successive frame, the polarization rotator 301 selectively changes the polarization state of the combined beam 304 from a first state to a second state. In one embodiment, the polarization rotator 301 rotates the combined beam 304 by about 90 degrees between refresh sweeps. (The terms "about" and "substantively" are used herein to refer to orientations inclusive of manufacturing and design tolerances.) For instance, when the light modulator 303 is generating a raster pattern 320, the polarization rotator 301 may be configured to change the orientation of its optical axis during a flyback period of the raster pattern 320. Accordingly, the first portion 313 of the combined beam 304 is in a first polarization state during odd frames, and a second polarization state during even frames, with the first polarization state being rotated by 90 degrees relative to the second polarization state. Similarly, the second portion 314 of the combined beam 304 is also rotated between sweeps such that it is in the second polarization state during odd frames, and the first polarization state during even frames.

Since the polarization rotator 301 switches states between frames, the first light portion 313 of the combined beam 304 creates right eye images, and the second light portion 314 creating left eye images, on even frames. However, on odd frames, the first light portion 313 creates left eye images and the second light portion 314 creates right eye images. Since each eye receives light in each frame, fading does not occur and perceived flicker is reduced.

A viewing apparatus, shown in FIG. 3 as a pair of glasses 321, directs polarization orientations of the first state to the right eye 324 and polarization orientations of the second state to the left eye 325. In the illustrative embodiment of FIG. 3, the glasses 321 include lenses 322,323 that have polarization filters. The polarization filters can be circular or linear. The first lens 322 has its polarization filter oriented in a first polarization state, while the second lens 323 has its polarization filter oriented in a second polarization state. In this illustrative embodiment, the first lens 322 has a vertical polarization filter, while the second lens 323 has a horizontal polarization filter.

When the polarization rotator 301 is in a first state, light from the green light source 305 passes through the first lens 322 and reaches the right eye 324, while light from the red light source 307 and the blue light source 306 is blocked. The light from the red light source 307 and the blue light source 306 passes through the second lens 323 and reaches the left eye 325, while light from the green light source 305 is blocked. However, in the next successive sweep, the polarization rotator 301 changes states. Now, light from the green light source 305 passes through the second lens 323 and reaches the left eye 325, while light from the red light source 307 and the blue light source 306 is blocked. The light from the green light source 305 passes through the first lens 322 and reaches the right eye 324, while light from the green light source 305 is blocked. Accordingly, each frame delivers light to both eyes. However, the color delivered to each eye switches from frame to frame due to the operation of the polarization rotator 301. The result is continuous imaging with reduced or minimal flicker 326.

Turning briefly back to FIG. 4, those of ordinary skill in the art will understand that it can be important to ensure that the right eye frames 402 and left eye frames 403 are correctly separated into the proper color panels 406,407,408,409. If, for example, one of the left eye frames 403, e.g., the left eye frame for image 405, is dropped or missed, the three-dimensional perception can be adversely affected.

To ensure that this does not happen, in one embodiment the control circuit 318 is equipped with a stereo pair sequence identification module 412. This module 412 can take one of various forms: First, the control circuit 318 can be equipped with an image processor that analyzes the image data in each frame to ensure that it is an odd or even frame. Second, the control circuit 318 can be configured to read metadata attached to each frame to identify whether it is an odd or even frame. Third, the module 412 can be equipped with a user selectable switch. If the user detects that the three-dimensional capability has been compromised, the user can flip a switch to change the phase of the polarization rotator 301. Each will now be described in more detail.

If, for whatever reason, there is a disruption in the read-in source video input 401, i.e., if the stereo pair is not left image right image, but is instead right image left image, the system risks the possibility of pushing a left eye image into the right eye, or vice versa, when the polarization rotator 301 is off by one cycle. In a first embodiment, to ensure this does not happen, the identification module 412 includes a metadata reader. Some stereoscopic video input 401 includes metadata attached to each frame indicating whether the frame is a right eye image or a left eye image. In such an environment, the identification module 412 is equipped to read the metadata so that the control circuit 318 can control the phase of the polarization rotator 301 accordingly. In a third embodiment, the identification module 412 comprises a user selectable switch, which may be a soft switch presented on a user interface or a physical control device. The switch allows the user to toggle switch when the three-dimensional capability is not working properly to change the phase of the polarization rotator 301.

In a second embodiment, the identification module 412 includes an image processor that analyzes the data of each frame to ensure that it is an odd or even frame. In stereoscopic video input 401, there are certain features, particularly when viewing straight lines in the images that differ between the left eye frames and the right eye frames. For instance, the length of a particular object may be longer in the one eye frame than in the other eye frame. Alternatively, the placement of a particular object may be closer to the edge of the frame in one side versus the other. Thus, in one embodiment the control circuit 318 includes an image-processing algorithm that compares, for example, data of the image for location placement within the image or size comparison between images. The image-processing algorithm allows the control circuit 318 to extract that feature and confirm that the proper data is being projected with the polarization rotator 301 in the correct position.

Figure 5:
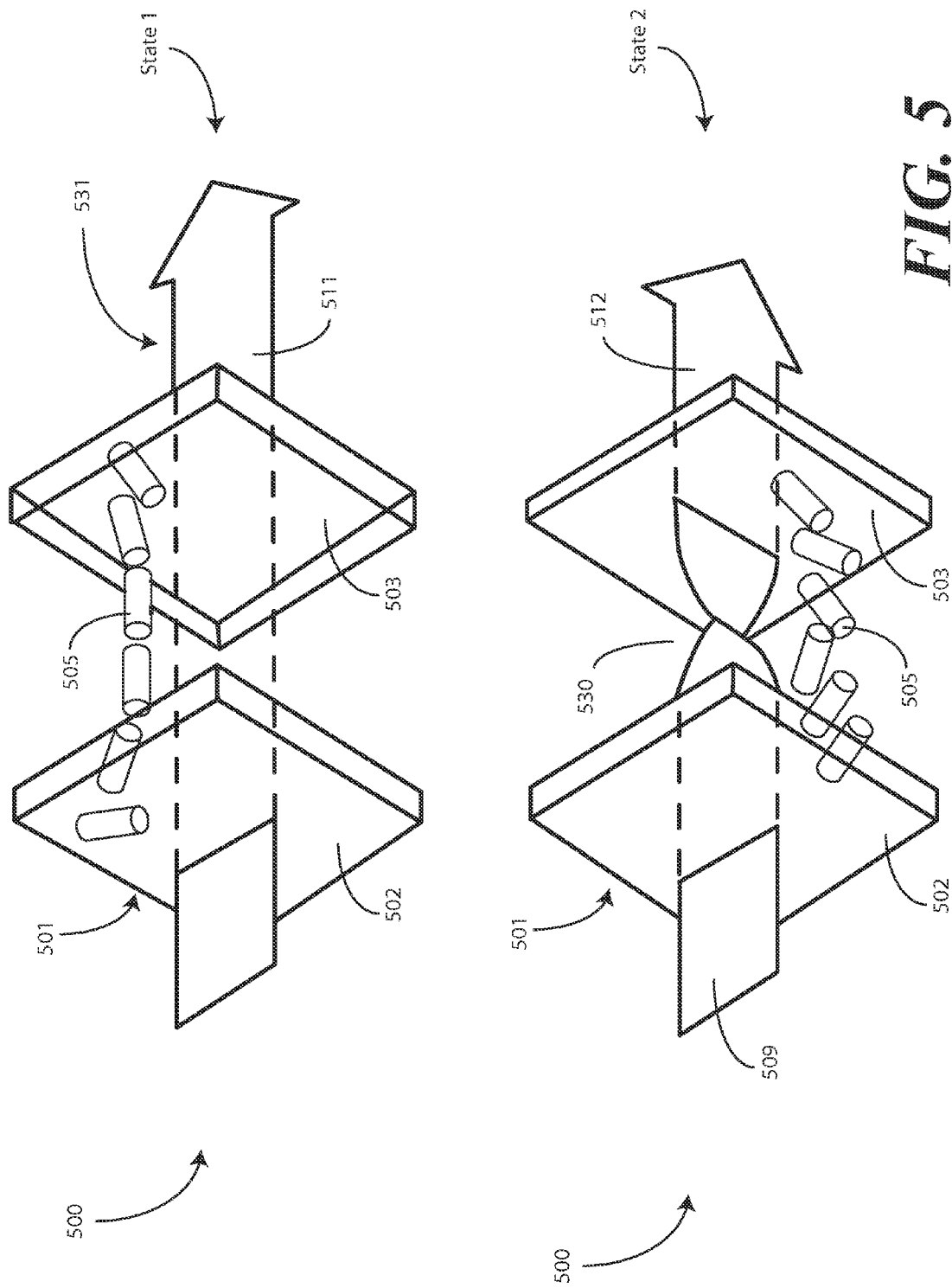
FIG. 5 illustrates one embodiment of a polarization rotator suitable for use with one or more embodiments of the invention.

The polarization rotator 301 can take multiple forms. In one embodiment, the polarization rotator 301 comprises a twisted nematic liquid crystal device. Turning now to FIG. 5, illustrated therein is one such device.

The polarization rotator 500 of FIG. 5 is manufactured using a twisted nematic liquid crystal material 501. While a twisted nematic liquid crystal material 501 is one illustrative material suitable for use as a polarization rotator 500, it will be clear to those of ordinary skill in the art having the benefit of this disclosure that other similar materials, such as polymer-dispersed liquid crystal material, super twisted nematic liquid crystal material, electrically-controlled birefringent material, optically-compensated bend mode material, guest-host materials, and other types of light modulating materials may equally be used.

The twisted nematic liquid crystal material 501 is disposed between two substrates 502,503 having electrodes disposed thereon. In the illustrative embodiment of FIG. 5, both the electrodes and substrates 502,503 are transparent. For example, the substrates 502,503 may be manufactured from plastic or glass, with the electrodes being deposited as indium-tin oxide affixed to each substrate 502,503. The electrodes can then be coupled to a variable voltage source (not shown) that is responsive to a controller. The controller causes the variable voltage source to apply a field to one substrate 502, while the other substrate 503 acts as a ground. (Note that the direction of the electric field is not important. Accordingly, either electrode can be coupled to the variable voltage source or can act as the ground.)

The electric field applied alters the light transmission properties of the twisted nematic liquid crystal material 501 by causing rotation of rod-like mesogens 505 forming the liquid crystal material. The mesogens 505 each function as an oriented optical element. When no electric field is applied between the substrates 502,503, the mesogens 505 rotate from one substrate 502 to the other substrate 503, thereby causing the polarization of an input beam 509 to rotate 530. When an electric field is applied between the substrates 502, 503, such as a voltage of five volts, the input beam 509 passes through 531 without rotation.

In one embodiment of the present invention, during a first refresh sweep of a three-dimensional image, a first voltage is applied across the substrates 502,503 to the twisted nematic liquid crystal material 501. Accordingly, the output beam 511 will have substantially the same polarization orientation as the input beam 509.

Once this sweep is completed, before a successively subsequent sweep begins, a second voltage, which may be zero volts, can be applied to the substrates 502,503 that causes the polarization orientation of the output beam 512 to rotate by about ninety degrees relative to the output beam 511 previously used to create the image. This subsequent output beam 512 can be used to create a three-dimensional image during the subsequent sweep. As the process is repeated, alternating the polarization orientation by about ninety degrees from sweep to sweep delivers light from different light sources into each eye on every frame, thereby reducing flicker.

Figure 6:
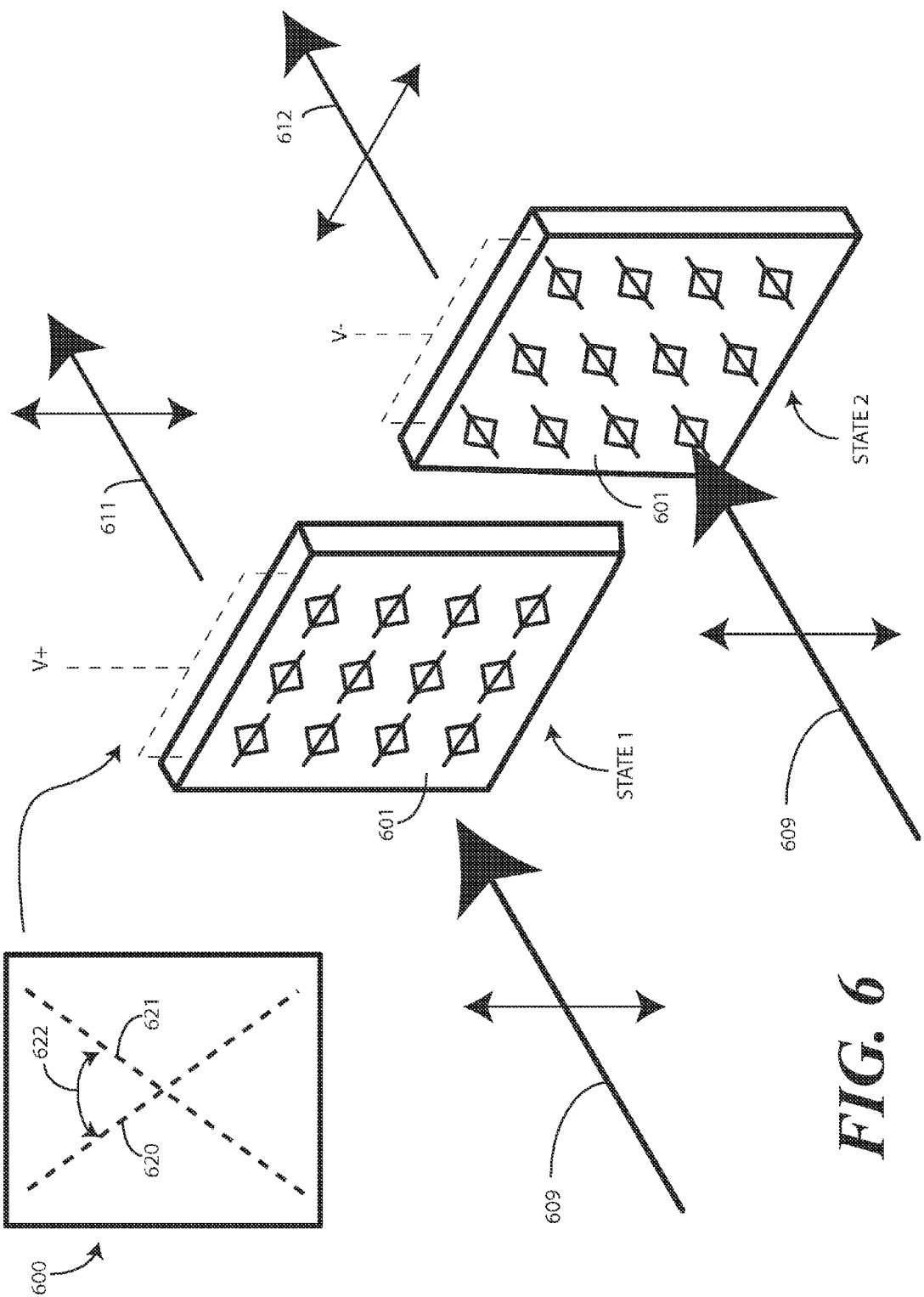
FIG. 6 illustrates another embodiment of a polarization rotator suitable for use with one or more embodiments of the invention.

Turning now to FIG. 6, illustrated therein is a second example of a polarization rotator 600 suitable for use with one or more embodiments of the invention. The polarization rotator 600 of FIG. 6 is a ferroelectric liquid crystal device (FLCD). The construction is similar to the twisted nematic device of FIG. 5, with electrodes disposed on substrates (not shown), which are coupled to a variable voltage source (not shown) and ground, as described above. (The common elements with FIG. 5 are not shown in FIG. 6.) However, rather than using a twisted nematic liquid crystal material, the polarization rotator 600 of FIG. 6 employs ferroelectric liquid crystal material 601.

While they can be manufactured in a variety of configurations, most standard ferroelectric liquid crystal devices are configured as "bistable" devices, which means that through the design of the mesogens, the device has particular bistable orientations of the optical axis. For example, in FIG. 6, two optical axis orientations 620,621 are shown. These optical axis orientations 620,621 are separated by a tilt angle 622, which is a product of the design. Each optical axis orientation 620,621 represents a mesogen alignment to which the mesogens orient in the presence of an applied voltage. As the orientation of the liquid crystal molecules is changed under applied voltage, the optical axis of the device rotates. In the ferroelectric device of FIG. 6, this means that the mesogens rotate by the tilt angle 622.

For linearly polarized light, the polarization rotator 600 can be configured to cause light of a particular wavelength to be output on polarization orientation states that are substantially twice the tilt angle 622. Where the tilt angle 622 is about forty-five degrees, this causes the output to rotate by about ninety degrees from state to state. Thus, an incident beam 609 of the target wavelength that is vertically polarized will be substantially transmitted as a vertically polarized output beam 611 when the polarization rotator 600 is in a first state. Similarly, an incident beam 609 that is vertically polarized will be substantially transmitted as a horizontally polarized output beam 612 that is orthogonal to the polarization state of the first state when the polarization rotator 601 is in the second state. In one embodiment, the two states are obtained by applying oppositely polarized voltages to the electrodes disposed about the ferroelectric liquid crystal material 601. It should be noted that the input polarizations do not need to be aligned with the optical axis of the polarization rotator 600. Since the tilt angle 622 is forty-five degrees, two polarization states rotated by ninety degrees with respect to one another will be generated even when the polarization rotator 600 optical axes are not aligned with the input polarization state. Since the polarization rotator 600 behaves as a "switchable" half-wave plate, this extra freedom allows the orientation of the polarization rotator 600 to be optimized for performance for wavelengths for which the thickness of the polarization rotator 600 is not a perfect half-wave plate.

While twisted nematic and ferroelectric devices are two illustrative active polarization switches, it will be clear to those of ordinary skill in the art having the benefit of this disclosure that embodiments of the invention are not so limited. For example, mechanical polarizers, e.g., a fixed half-wave plate that gets twisted between two orientations, can be substituted for the ferroelectric or twisted nematic devices described above. Additionally, a faraday rotator that is configured to give two orthogonal output polarization states can be used as well. Further, those of ordinary skill in the art may appreciate that multiple polarization rotators can be used in a particular design. For instance, when using FLCD material, a designer may opt to use one polarization rotator for each light source, with the FLCD device being designed for that light source's principle wavelength.

Figure 7:
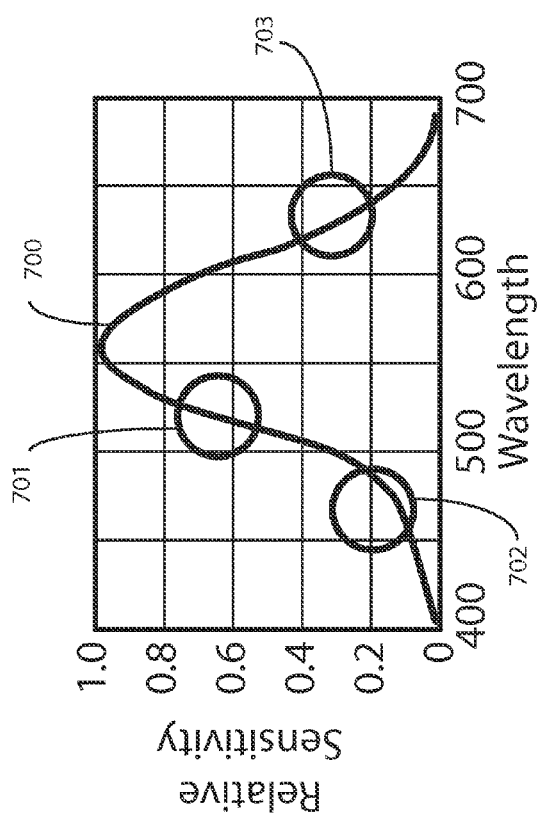
FIGS. 7 and 8 show charts illustrating photopic power equalization in accordance with one or more embodiments of the invention.
Figure 8:
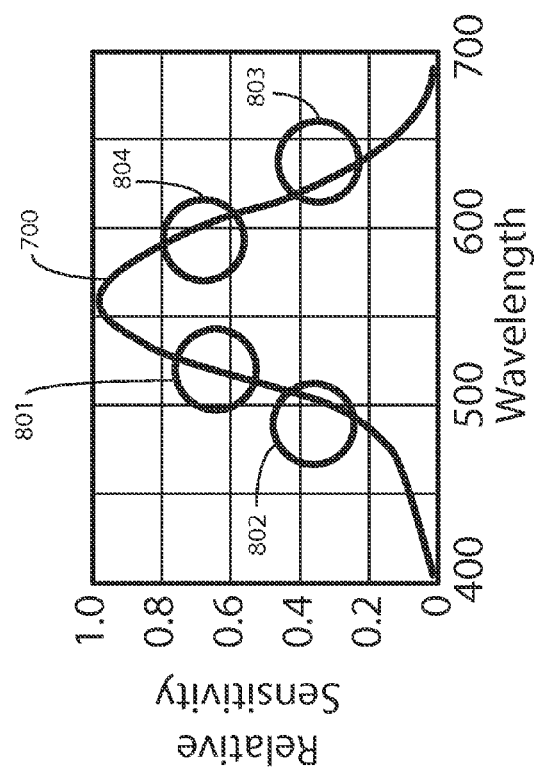

Now that basic operation is understood, a note should be made about the selection of which components of the combined beam are polarized in each orientation. Recall from the example in FIG. 3 above, green light was polarized with a first orientation, while red and blue light were polarized with a second orientation. Those of ordinary skill in the art will recognize that in a system having red, green, and blue light sources, there are three different combinations that can be used. Embodiments of the invention can work with any of the combinations of light. However, experimental testing has shown that some combinations perform better than others based on particular wavelengths of light used to create each primary color. Turning now to FIGS. 7 and 8, two combinations will be discussed.

Beginning with FIG. 7, illustrated therein is a graph of an average viewer's eye sensitivity 700 to color and brightness. When considering brightness or color separately, the sensitivity 700 may have a different shape. However, when viewing projected images, as the brightness and color content is unpredictable, the sensitivity 700 of FIG. 7 provides a good approximation of an average as seen by an average viewer.

In the embodiment of FIG. 7, green light 701 is separated from red light 702 and blue light 703 in the interest of sensitivity balance in the viewer's eye. When the sensitivity 700 of the viewer's eye to blue light 703 is added to the sensitivity 700 to red light 702, it is closer to balancing the sensitivity 700 to green light 701 than if another combination had been used. For this reason, the example of FIG. 3 oriented the polarization of green light 701 differently from the red light 702 and blue light 703. When the polarization rotator (301) switched, a somewhat equal amount of light would be delivered to the opposite eye, keeping the average amount approximately constant. If blue light 703 had been polarized differently from green light 701 and red light 702, the viewer may see a bright flash of green and red interchangeably with a muted amount of blue. This could lead to a less than optimum viewing experience.

Turning to FIG. 8, illustrated therein is a four-light system having red light 802, green light 801, yellow light 804, and blue light 800. The sensitivity of each is present on the eye sensitivity 700 curve. When the green light 801 and red light 802 are polarized with a first orientation, with the yellow light 804 and the blue light 803 polarized in a different orientation, there is again approximate sensitivity balancing across successive frames in the viewer's eye. As noted above, it can be advantageous to attempt to equalize the photopic power perceived in each eye across frames as the polarization rotator changes states. If the red light 802 is configured with a first polarization, while the green light 801, yellow light 804, and blue light 803 are polarized in a second orientation, the possibility exists for a viewer to perceive a large flash of yellow, green, and blue in one eye, and a dull flash of red in the other eye. When the polarization rotator changes phase, the opposite is true. This can appear to be flicker. To avoid flicker, the examples of FIGS. 7 and 8 offer combinations that work to normalize the chroma of each half frame with respect to the other half frame. A target would be fifty percent of the light polarized in the first orientation and fifty percent of the light polarized in the second orientation. However, the reality of the light sources must be considered. Experimental testing has shown that ranges of sixty percent to forty percent, or in some cases seventy percent to thirty percent, can be used to adequately reduce flicker. While the graphs in FIGS. 7 and 8 provide illustrative examples, the choices may change as a function of the wavelengths of the light sources used. For example, if the red light source employs a shorter wavelength of red light, while the blue light source employs a longer wavelength of blue, the photopic powers would change some from those shown in FIGS. 7 and 8. Accordingly, other embodiments may attempt to reach the target average fifty-fifty balance with other combinations.

Figure 9:
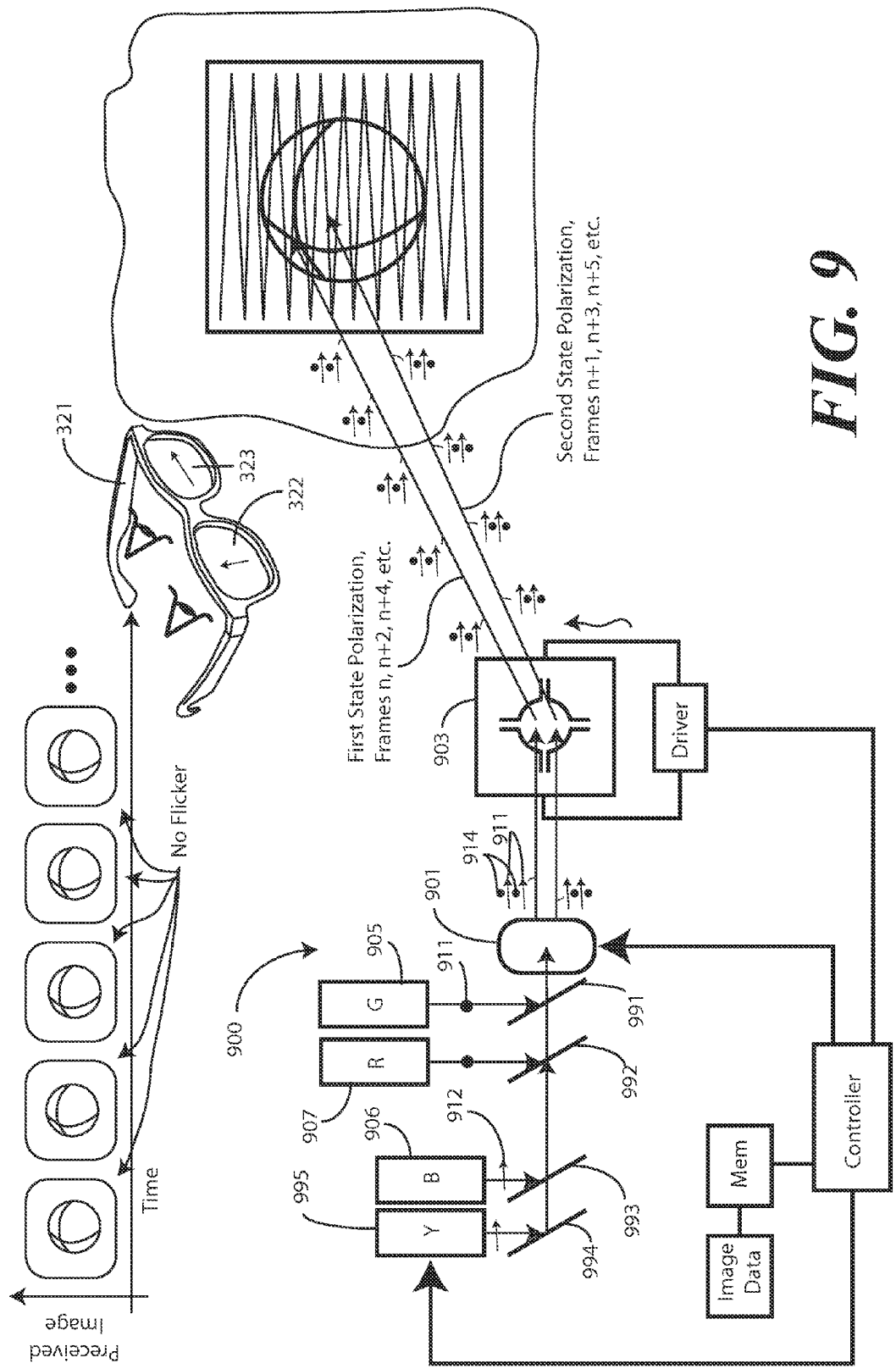
FIG. 9 illustrates another imaging system configured in accordance with one or more embodiments of the invention.

Turning to FIG. 9, illustrated therein is a system 900 employing four light sources as described with reference to FIG. 8. As with FIG. 3 above, the imaging system 900 of FIG. 9 employs a combined beam 904 having diverse polarization oriented portions and a polarization rotator 901. The polarization rotator 901 is disposed an optical path of the imaging system 900 between the light combiners 991,992,993,994 and a light modulator 903. The polarization rotator 901 is configured to selectively rotate a polarization state of a combined beam 904 in synchrony with an image refresh cycle of the imaging system 900. Blue and yellow information from the left eye panes and red and green information from the right eye panes is configured with a first polarization orientation in a first frame, and red and green information from the left eye panes and blue and yellow information from the right eye panes is configured with a second polarization orientation in a first frame. In a next frame, when the polarization rotator 901 causes the polarization orientation of the combined bean 904 to rotate, the opposite occurs. In this fashion, the polarization rotator 901 ensures that the correct information is delivered to the correct eye. As the components delivering information to each eye change from frame to frame, flicker is reduced and without degrading the color quality.

In FIG. 9, a plurality of light sources includes a green light source 905, a yellow light source 995, a blue light source 906, and a red light source 907. The light combiners 991,992,993, 994 combine light received from the various light sources 905,905,906,907. In this illustrative embodiment the yellow light source 905 and blue light source 906 are oriented so as to deliver light beams polarized with a first orientation 912, while the red light source 907 and the green light source 905 are configured to deliver light beams polarized in a second orientation 911. The light delivered to the polarization rotator 901 is a combined beam 904 comprising red and green components polarized along a first orientation, with blue and yellow light components polarized along a second orientation. Since the red and green light are polarized differently from the blue and yellow light, the combined beam 904 will include a first light portion 913 having a first light portion polarization state and a second light portion 914 having a second light portion polarization state.

The polarization rotator 901 then alters the polarization orientation of portions 913,914 of the combined beam 904 in synchrony with the image refresh cycle. Accordingly, the first portion 913 of the combined beam 904 is in a first polarization state during odd frames, and a second polarization state during even frames, with the first polarization state being rotated—in one embodiment—by 90 degrees relative to the second polarization state. Similarly, the second portion 914 of the combined beam 904 is also rotated between sweeps such that it is in the second polarization state during odd frames, and the first polarization state during even frames.

Since the polarization rotator 901 switches states between frames, the first light portion 913 of the combined beam 904 creates right eye images, and the second light portion 914 creating left eye images, on even frames. However, on odd frames, the first light portion 913 creates left eye images and the second light portion 914 creates right eye images. Since each eye receives light in each frame through the glasses 321, fading does not occur and perceived flicker is reduced.

To this point, the viewing devices, e.g., glasses 321, have included linear polarization filters in the lenses 322,323. This configuration works fine in practice, and aids in describing the operation of the system in one or more embodiments. However, to facilitate greater freedom in movement of the viewer's head while preserving three-dimensional perception, other embodiments employ circular polarization rather than linear polarization. Circular polarization is achieved, in one or more embodiments, with the use a circular polarizer disposed within the optical path to convert linear polarization to circular polarization. Such a configuration works well in laser projection systems because the output of each laser is generally well defined and linearly polarized. The addition of a circular polarizer, such as a quarter wave plate, can work to cause the linear polarizations to become circular polarizations. This allows the lenses 322,323 of the glasses 321 to be circular polarization filters rather than linear polarization filters, which in turn allows greater movement of the viewer's head without loss of three-dimensional perception. Note that while the circular polarizer can be a quarter wave plate, other devices can be used, including achromatic quarter wave plates or other devices.

Figure 10:
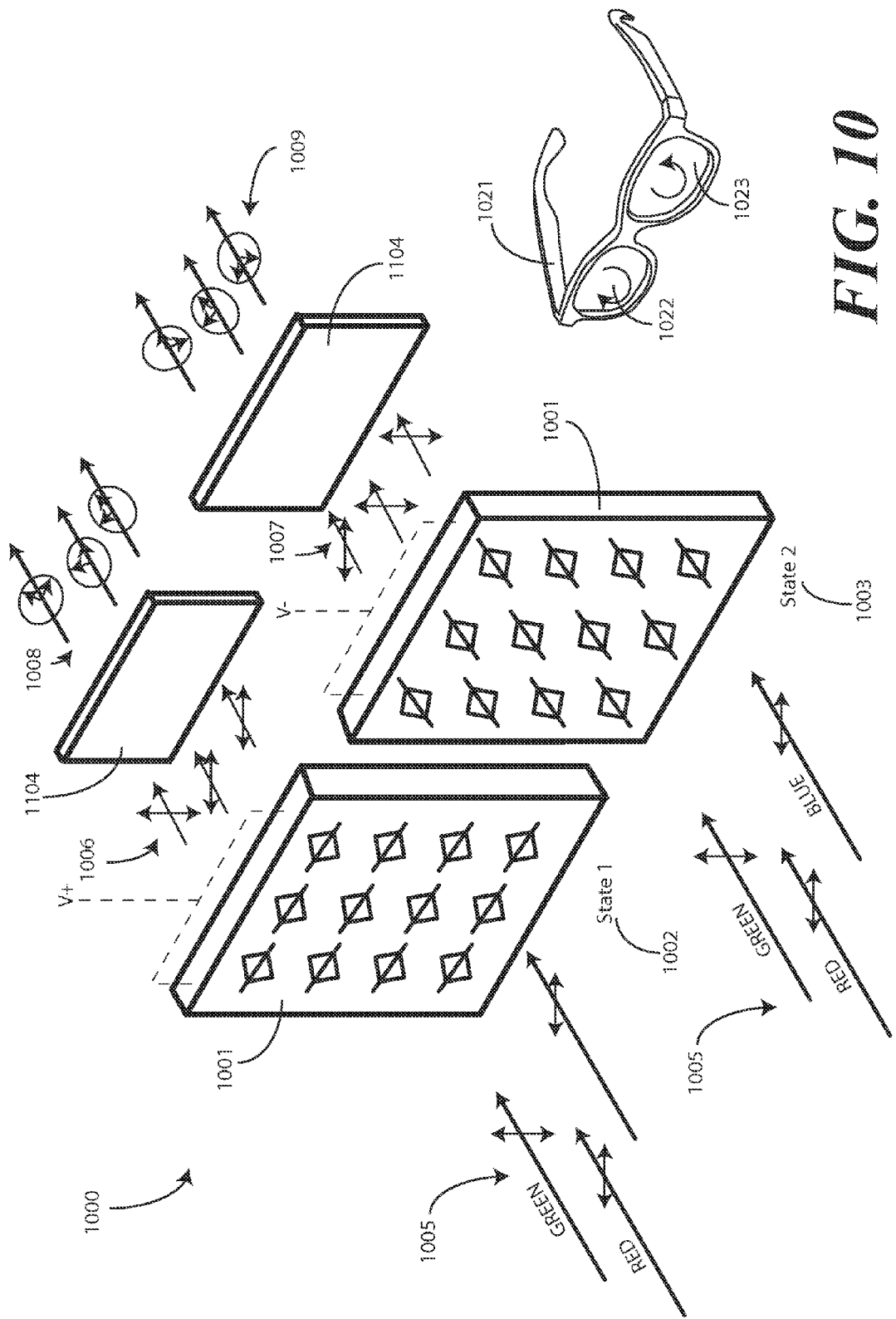
FIG. 10 illustrates the use of a circular polarizer in accordance with one or more embodiments of the invention.

Turning now to FIG. 10, illustrated therein is a polarization rotator assembly 1000 that includes a polarization rotator 1001, shown in two states 1002,1003, with a circular polarizer 1004 disposed in the optical path between the polarization rotator 1001 and a light modulator (not shown). While the polarization rotator 1001 and circular polarizer 1004 are shown as singular devices, those of ordinary skill in the art with the benefit of this disclosure will readily recognize that individual polarization rotator/circular polarizer pairs can be used for each light source. The polarization rotator 1001 and circular polarizer 1004 may be, for example tailored to each principle wavelength. A single polarization rotator 1001 and circular polarizer 1004 are shown in FIG. 10 for ease of illustration.

Operation of the polarization rotator 1001 is similar to that described with reference to FIG. 6 above. When the polarization rotator 1001 is in a first state 1002, output beams 1006 are polarized in a first state relative to the corresponding input beams 1005. When the polarization rotator 1001 is in a second state 1003, the output beams 1007 are polarized in a second state, rotated relative to the first state, by an amount that is ninety degrees in one or more embodiments.

The addition of the circular polarizer 1004 causes the output beams 1006,1007 to become circularly or elliptically polarized output beams 1008,1009. The use of circularly or elliptically polarized light allows the lenses 1022,1023 of the glasses 1021 to be circular polarization filters. To provide different light to each eye as the polarization rotator 1001 changes states 1002,1003, the circular polarization filters of each lens 1022,1023 can pass orthogonal polarizations. For example, lens 1022 can have a left hand circularly polarized filter, while lens 1023 can have a right hand circularly polarized filter.

Figure 11:
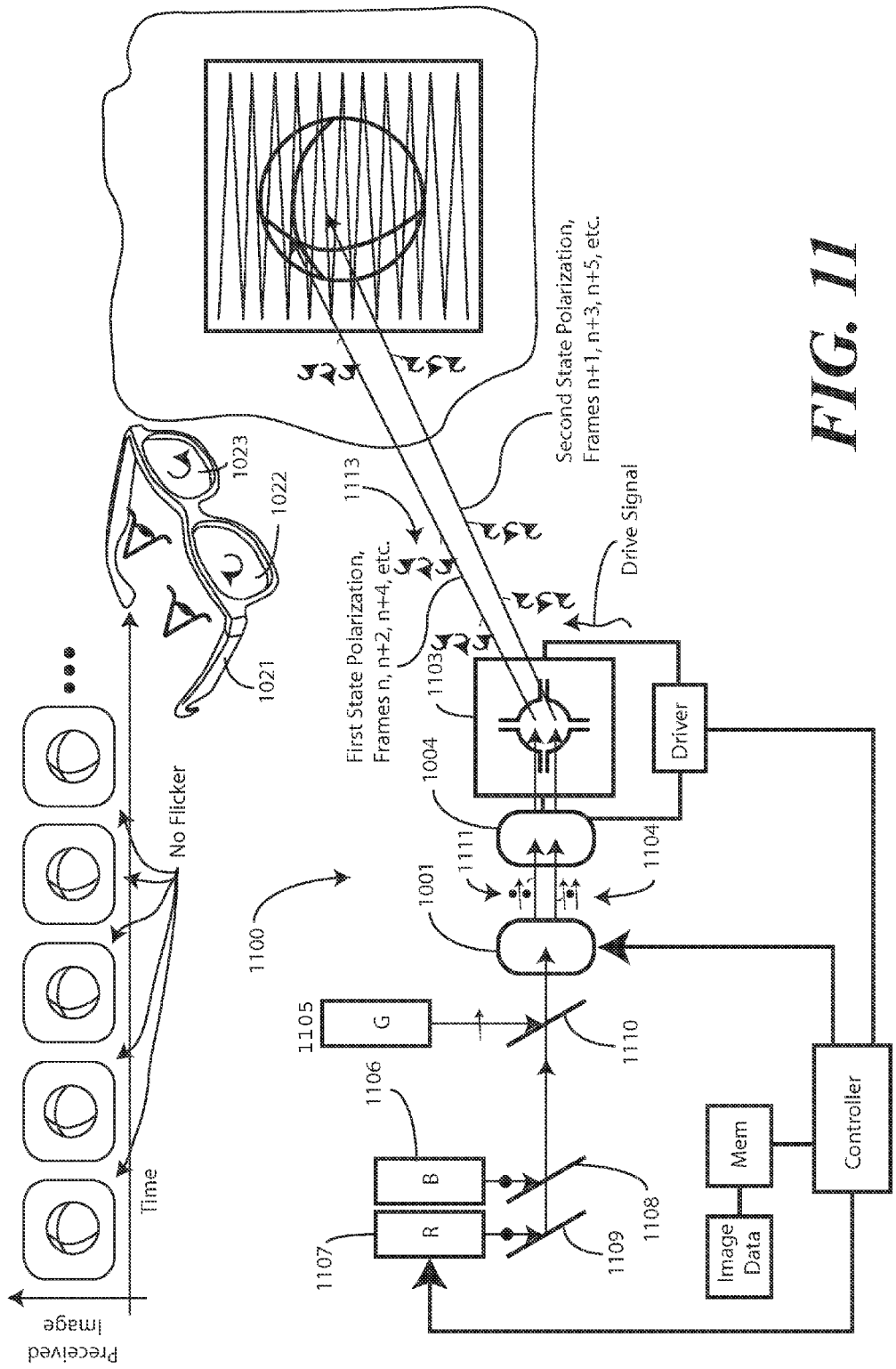
FIG. 11 illustrates another imaging system configured in accordance with one or more embodiments of the invention.

Turning to FIG. 11, illustrated therein is a system 1100 employing the polarization rotator 1001 and circular polarizer 1004 of FIG. 10. The system 1100 includes a plurality of laser light sources 1105,1106,1107. The light sources 1105, 1106,1107 deliver light to a light modulator, which can be an electromechanically controllable scanning assembly configured to pivot in response to a drive signal to scan the light in substantially a raster pattern. One or more light combiners 1108,1109, 1110 disposed in the optical path between the light sources 1105,1106,1107 and light modulator 1103 combine light received from the light sources 1106,1107 polarized along a first orientation with other light received from other light sources 1105 polarized along a second orientation. The polarization rotator 1101 selectively alters a polarization state of the combined beam between frames.

As can be seen, the combined beam 1104 initially contains linearly polarized components 1111. However, after passing through the circular polarizer 1004, the linear polarized components 1111 become circularly polarized components 1113 because the circular polarizer 1004 is configured to the circular polarizer is configured to transform the first light portion polarization state of the combined beam 1104 and the second light portion polarization state of the combined beam 1104 to circular polarization states. Accordingly, the glasses 1121 have lenses 1022,1023 that include circular polarization filters, with each circular polarization filter being different from the other. While the polarization rotator 1001 and circular polarizer 1004 of FIG. 11 are being used with a laser projection system for illustration, it should be noted that the same could also be used in other types of projection systems as well as noted above.

Figure 12:
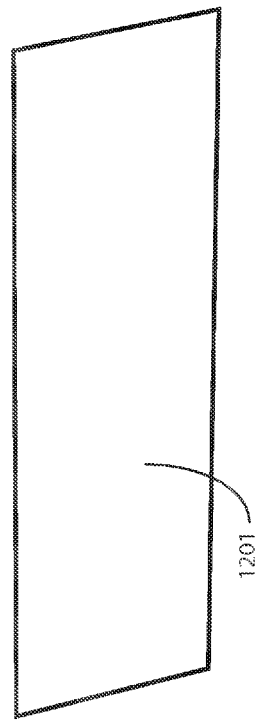

Turning now to FIG. 12, illustrated therein is one projection surface 1201 suitable for use with embodiments of the invention. Projection surface 1201 is substantially flat, as shown in FIGS. 3, 9, and 11 above. It should be noted that in certain embodiments, other shapes can be used as well. The alternative shapes can be advantageously used in particular applications, such as gaming applications, business marketing applications, and special effects applications.

In one or more embodiments, the projection surface 1201 is a "polarization preserving" projection surface. As is known, if a projection surface has a generic coating, such as flat wall paint, the light reflected therefrom would be non-polarized. This could disrupt the components of the combined beans discussed above. Accordingly, in one embodiment, a silvered projection screen or other polarization preserving screen surface is used to form projection surface 1201. Silvered projection screens used to be expensive, fragile materials. However, with advances in technology, silvered projection screens are now readily available and durable. Some can be made to be foldable and washable, and can be configured in different shapes.

Figure 13:
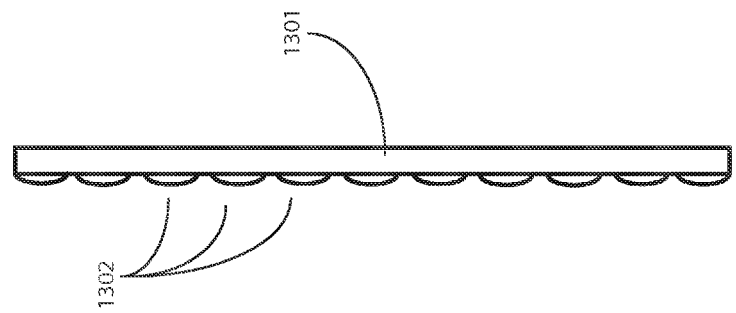
FIGS. 12 and 13 illustrate embodiments of projection screens suitable for use with one or more embodiments of the invention.

Turning to FIG. 13, illustrated therein is one unique form of a projection surface 1301 that is not only polarization preserving, but is also speckle reducing as well. Rather than employing a silver screen material, the projection surface 1301 of FIG. 13 employs a microlens array 1302.

The microlens array 1302 can be manufactured from a molded liquid polymer to form each microlens disposed along the surface of the projection surface 1301. Alternatively, the microlens array 1302 may be embossed across the projection surface 1301 by a roll embossing process. Each microlens can comprise single or complementary glass or plastic bead, or microspheres or nanosnperes, or similarly shaped objects capable of functioning as an optical diffusers. A reflective layer may be disposed on each microlens to impart reflective properties. Examples of reflective layers include thin coatings of aluminum or other suitable metals. The reflective layer layers can also be manufactured from a thin film or laminated stack of dielectric materials, or a combination of dielectric materials and metals.

A silvered screen has a surface that scatters or reflects light by means of a random array of scatterers. By contrast, the microlens array 1302 is ordered, i.e., it is not random. Accordingly, with a reflective coating the microlens array 1302 not only reflects the received light spreading to the beam and accordingly works as a screen, but also works to reduce speckle. This is true because the combined beams that are scanned to create images have diverse polarization components. When reflected from the microlens array, the light seen by the viewer is polarization diverse, and thus uncorrelated, and is less likely to result in perceived speckle.

As illustrated and described above, an imaging system configured to reduce perceived flicker in three-dimensional images produced by the imaging system includes a plurality of light sources, a light combiner, and a polarization rotator. The light combiner is configured to combine light received from each of the plurality of light sources into a combined beam. A first light portion in the combined beam has a first light portion polarization state that is substantially orthogonal relative to a second light portion polarization state of a second light portion of the combined beam. The light modulator then produces images with the combined beam by modulating the combined beam along a projection surface. The polarization rotator, which can be disposed in an optical path of the imaging system between the light combiner and the light modulator, is configured to selectively rotate a polarization state of the combined beam in synchrony with an image refresh cycle of the imaging system. In one or more embodiments, the refresh cycle comprises a raster pattern. The polarization rotator thus alters the polarization state between each raster sweep of the raster pattern.

The polarization rotator can be a twisted nematic liquid crystal device. Alternatively, the polarization rotator can be a ferroelectric liquid crystal device. A single polarization rotator can be used. In other embodiments, multiple polarization rotators can be used. In one embodiment, a polarization rotator can be used with each light source.

In one embodiment, three light sources are used. The first light portion of the combined beam comprises light from a first light source, while the second light portion comprises combined light from a second light source and a third light source. Where the three light sources are a green light source, a red light source, and a blue light source, the first light source can comprise the green light source, while the second light source and the third light source can comprise the red light source and blue light source, respectively, to equalize the photopic power.

In another embodiment, four light sources are sued. The first light portion of the combined beam can comprise light from a first light source and a second light source, while the second light portion comprises light from a third light source and a fourth light source. Where the four light sources are red, blue, green, and yellow, the first light portion can comprise blue light and yellow light, while the second light portion comprises red light and green light.

Projection surfaces used with embodiments of the invention can be polarization preserving. Additionally, where the projection surface comprises a microlens array, the projection surface can be speckle reducing as well.

Viewing apparatuses can be configured as special glasses comprising a first lens and a second lens. Each lens can be configured as a polarization filter, where the polarization filter of the first lens is oriented substantially orthogonally from the polarization filter of the second lens.

Some embodiments include a circular polarizer disposed in the optical path after the polarization rotator. The circular polarizer is configured to transform the first light portion polarization state and the second light portion polarization state of the combined beam to circular polarization states. Examples of circular polarizers include quarter-wave plates. Where the circular polarizer is employed, the glasses can include lenses each configured as circular polarization filters, wherein the circular polarization filter of the first lens is different from the circular polarization filter of the second lens.

The control circuit can be configured to receive stereoscopic content, identify portions of the stereoscopic content as right images and left images, split the stereoscopic content into different color panes, with a first color pane corresponding to a right image and a second color pane corresponding to a left image, and recombine a selected right image having a first color characteristic with a selected left image having a second color characteristic. The first color characteristic and the second color characteristic can be different. The first color characteristic and the second color characteristic can correspond to the light colors forming the first portion and the second portion of the combined beam. The control circuit can also be configured to identify the portions of the stereoscopic content by one or more of reading metadata of the stereoscopic content or analyzing image data of the stereoscopic content.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while embodiments described above employed a polarization rotator that switches between frames, in one or more embodiments, a control circuit can retain the capability not to switch every frame in special circumstances. If the video input is stereoscopic, i.e., if it is coming in left eye frame, right eye frame, left eye frame, right eye frame, etc., and somewhere in the input one of the images gets dropped or omitted, the control circuit would hold the polarization rotator in a state for two continuous frames so that stereo output was not interrupted. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An imaging system configured to display three-dimensional images, comprising:
    a plurality of light sources;
    a light combiner configured to combine light received from each of the plurality of light sources into a combined beam, wherein a first light portion in the combined beam has a first light portion polarization state that is substantially orthogonal relative to a second light portion polarization state of a second light portion of the combined beam;
    a light modulator configured to produce the three-dimensional images with the combined beam by modulating the combined beam along a projection surface; and
    a polarization rotator disposed in an optical path of the imaging system that is configured to selectively rotate a polarization state of the combined beam having the first light portion polarization state and the second light portion polarization state in synchrony with an image refresh cycle of the imaging system.

2. The imaging system of claim 1, wherein the light modulator is configured to produce the images by moving substantially in a raster pattern, wherein the polarization rotator is configured to alter the polarization state between each raster sweep of the raster pattern.

3. The imaging system of claim 1, wherein the polarization rotator is disposed in the optical path between the light combiner and the light modulator.

4. The imaging system of claim 1, wherein the polarization rotator comprises a twisted nematic liquid crystal device.

5. The imaging system of claim 1, wherein the polarization rotator comprises a ferroelectric liquid crystal device.

6. The imaging system of claim 1, wherein the plurality of light sources comprise three light sources, wherein the first light portion comprises light from a first light source, and the second light portion comprises combined light from a second light source and a third light source.

7. The imaging system of claim 6, wherein:
the first light source comprises a green light source;
the second light source comprises one of a red light source or a blue light source; and
the third light source comprises another of the red light source or the blue light source.

8. The imaging system of claim 7, wherein green light from the green light source is one of p-polarized or s-polarized relative to the light combiner and blue light from the blue light source and red light from the red light source is another of p-polarized or s-polarized relative to the light combiner.

9. The imaging system of claim 1, wherein the plurality of light sources comprises four light sources, wherein the first light portion comprises a combined light from a first light source and a second light source, and the second light portion comprises another combined light from a third light source and a fourth light source.

10. The imaging system of claim 9, wherein:
the first light source comprises one of a blue light source or a yellow light source;
the second light source comprises another of the blue light source or the yellow light source;
the third light source comprises one of a red light source or a green light source; and
the fourth light source comprises another of the red light source or the green light source.

11. The imaging system of claim 1, further comprising the projection surface, wherein the projection surface is polarization preserving.

12. The imaging system of claim 11, wherein the projection surface comprises a microlens array.

13. The imaging system of claim 1, further comprising a viewing apparatus comprising a first lens and a second lens, each configured as a polarization filter, wherein the polarization filter of the first lens is oriented substantially orthogonally from the polarization filter of the second lens.

14. The imaging system of claim 1, further comprising a circular polarizer disposed in the optical path after the polarization rotator, wherein the circular polarizer is configured to transform the first light portion polarization state and the second light portion polarization state to orthogonal polarization states.

15. The imaging system of claim 14, wherein the circular polarizer comprises a quarter-wave plate.

16. The imaging system of claim 14, further comprising a viewing apparatus comprising a first lens and a second lens, each configured as a circular polarization filter, wherein the circular polarization filter of the first lens is different from the circular polarization filter of the second lens.

17. The imaging system of claim 1, further comprising a control circuit operable with the polarization rotator, wherein the control circuit is configured to receive stereoscopic content, identify portions of the stereoscopic content as right images and left images, split the stereoscopic content into different color panes, with a first color pane corresponding to a right image and a second color pane corresponding to a left image, and recombine a selected right image having a first color characteristic with a selected left image having a second color characteristic, wherein the first color characteristic and the second color characteristic are different.

18. The imaging system of claim 17, wherein the control circuit is configured to identify the portions of the stereoscopic content by one or more of reading metadata of the stereoscopic content or analyzing image data of the stereoscopic content.

19. A laser scanning image system configured to present three-dimensional images, comprising:
a plurality of laser light sources;
an electromechanically controllable scanning assembly configured to receive light from the plurality of laser light sources and to pivot about a first axis and a second axis in response to a drive signal to scan the light in substantially a raster pattern;
a light combiner disposed in an optical path between the plurality of laser light sources and the electromechanically controllable scanning assembly, the light combiner being configured to combine light received from one or more of the plurality of laser light sources polarized along a first orientation with other light received from others of the plurality of laser light sources polarized along a second orientation that is different from the first orientation into a combined beam; and
a polarization rotator disposed in the optical path between the light combiner and the electromechanically controllable scanning assembly that is configured to selectively alter a polarization state of light received from the light combiner in synchrony with an image refresh cycle of the laser scanning image system, wherein the light received from the combiner includes the light polarized along the first orientation and the light polarized along the second orientation.

20. The laser scanning image system of claim 19, further comprising a circular polarizer disposed between the polarization rotator and the electromechanically controllable scanning assembly.

* * * * *